US000001379H

United States Statutory Invention Registration [19]

[11] Reg. Number: H1379

Meuer

[43] Published: Dec. 6, 1994

[54] SUPERSONIC FAN NOZZLE FOR ABRASIVE BLASTING MEDIA

[75] Inventor: Gary D. Meuer, Fairborn, Ohio

[73] Assignee: The United States of America as represented by the Secretary of the Air Force, Washington, D.C.

[21] Appl. No.: 977,732

[22] Filed: Nov. 16, 1992

Related U.S. Application Data

[63] Continuation-in-part of Ser. No. 727,265, Jun. 25, 1991, abandoned.

[51] Int. Cl.[5] ..... B24C 5/04

[52] U.S. Cl. ..... 451/38; 239/597; 451/102

[58] Field of Search ..... 51/319, 320, 427, 439, 51/293; 239/597, 590.5

[56] References Cited

U.S. PATENT DOCUMENTS

| | | | |
|---|---|---|---|
| 2,379,432 | 7/1945 | Heany | 51/439 |
| 2,605,596 | 8/1952 | Uhri | 51/282 |
| 2,900,851 | 8/1959 | Rutledge . | |
| 3,398,899 | 8/1968 | Fry | 239/897 |
| 3,561,163 | 2/1971 | Arnold | 51/8 |
| 3,861,598 | 1/1975 | Fleischer | 239/543 |
| 4,013,486 | 3/1977 | Engel | 148/9.5 |
| 4,035,870 | 7/1977 | Reba et al. | 19/155 |
| 4,169,556 | 10/1979 | Muller | 239/434 |
| 4,237,209 | 12/1980 | Oliver | 430/317 |
| 4,253,610 | 3/1981 | Larkin | 230/430 |
| 4,272,612 | 6/1981 | Oliver | 430/323 |
| 4,395,850 | 8/1983 | Brown | 51/439 |
| 4,622,714 | 11/1986 | Tomasillo | 15/316 |
| 4,631,250 | 12/1986 | Hayashi | 51/319 |
| 4,633,623 | 1/1987 | Spitz | 51/439 |
| 4,731,125 | 3/1988 | Carr | 134/17 |
| 4,741,130 | 5/1988 | Tano et al. | 51/319 |
| 4,813,611 | 3/1989 | Fontana | 239/590.5 |
| 4,815,241 | 3/1989 | Woodson | 51/439 |
| 4,843,770 | 7/1989 | Crane et al. | 51/439 |
| 5,044,129 | 9/1991 | Olevitch | 51/319 |
| 5,050,805 | 9/1991 | Lloyd et al. | 239/597 |

*Primary Examiner*—David Brown

*Attorney, Agent, or Firm*—Fredric L. Sinder; Thomas L. Kundert

[57] ABSTRACT

A supersonic fan nozzle for abrasive blast removal of coatings particularly for use with plastic abrasive media, provides much greater media particle velocity, a more uniform velocity profile, and a more uniform media particle distribution than prior art nozzles. The new nozzle has a constant height throat area about 1 inch long, about 1.57 inches wide, and about 0.125 inche high. The throat opens into a constant height diverging slot which diverges at about a 6.5 degree half-angle for about 9.5 inches to a final exit width of about 3.75 inches. A nozzle-to-hose coupling connects at one end to a conventionally sized blasting hose and at the other by a rectangular opening to the throat. Used with light plastic media entrained in an airflow stream at operating pressures of 15 to 80 psig, the nozzle has successfully removed coatings from a variety of delicate underlying substrates with little or no observable damage to the substrates. In tests, it has produced minimal residual stress effects on substrates while increasing production stripping rates by 50–200% . Tests have shown that the optimum range of dimensions for the new nozzle are a slot exit area to throat area ratio about 2.2 to about 2.5 and a constant divergence half-angle of about 5 to about 8 degrees.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUPERSONIC FAN NOZZLE FOR ABRASIVE BLASTING MEDIA

RIGHTS OF THE GOVERNMENT

The invention described herein may be manufactured and used by or for the Government of the United states for all governmental purposes without the payment of any royalty.

CROSS-REFERENCE TO RELATED APPLICATIONS

This application is a continuation-in-part of application Ser. No. 07/727,265, filed on Jun. 25, 1991, now abandoned.

BACKGROUND OF THE INVENTION

The present invention relates generally to abrasive blast coating removal methods, and more particularly to nozzles for abrasive blast removal of coatings from delicate substrates without damaging the substrate.

Paint coatings, photoresist coatings and other protective and decorative coatings frequently must be removed from their underlying substrates. A common method for removing these coatings is abrasive blasting. Abrasive blasting shoots a stream of abrasive particles, or media, through a nozzle at the coating to be removed. The abrasive particles may be carried by a stream of a compressible vapor or gas, generally air, or a stream of an incompressible liquid, generally water. The most commonly used blasting media in the past was sand. Unfortunately, sand blasting, while very effective at removing paints and other coatings, often imparts unacceptable levels of damage to thin or delicate substrate materials. Printed circuit boards are an example of such a substrate material. So too are newer aircraft outer skin materials such as fiber reinforced plastic composites and very thin aluminum.

To deal with these problems, the prior art has tried softer media, such as plastic beads, sodium bicarbonate, ice crystals, wheat starch, walnut shells, glass beads and the like. Even with such softer media, however, there has been a concern in the aerospace industry about the residual effects of abrasive blasting on aerospace structures. For example, thin aluminum structures of 0.080 inch and less are susceptible to fatigue life reduction from the abrasive blasting process. To reduce this problem, acceptable blasting parameters for plastic media blasting in the aerospace industry using conventional compressible gas type round-conical blasting nozzles have been limited to air pressures of 40 psig, and less, at a 12 to 24 inch standoff distance. These same lowered abrasive blasting parameters have also been used to remove paint, called depainting, from composite substrates without imparting significant, or at least unacceptable, substrate damage.

As mentioned, round-conical blast nozzles are conventionally used with plastic media entrained in a compressible gas stream to remove coatings from delicate substrates. A primary problem with such round blast nozzles is their nonuniform velocity distribution. The center of the blast stream constitutes a "hotspot" of higher velocity particles, surrounded by a greater area of slower, and less effective, media. Further, the outside area of slower media is ineffective, overblasts the substrate, and can add an undesirable peening effect to delicate substrates which results in unnecessary residual stresses.

Another problem with conventional round-conical blast nozzles is the small size of the blast footprint projected onto the coated substrate. Not only is it slow to remove surface coatings by sweeping a 0.5 to 1.5 inch round spot, it results in a mottled surface appearance, especially on composites. Also, much of the residual primer left over after outer paint removal is nonuniform and unsightly, requiring further treatment to level the finish or resulting in local gouging or fiber damage to composite matrix material.

A further problem with conventional round-conical blast nozzles is that the maximum stripping rate that can be maintained by an operator is very limited. The physical traverse rate that can be finely controlled and is repeatable is only a few inches per second. Also, the uneven distribution of blast media makes overlapping necessary, further reducing efficiency, and does not provide a sharp edge for careful work. Only a large stripping path, with more even distribution of both blast energy and media, will increase production rates.

The prior art has also tried fan nozzles to achieve at least a wider swath, and hopefully a more even distribution of media particles and a flatter velocity profile at the nozzle exit. These prior art fan nozzles, while an improvement, unfortunately have not been uniformly successful. They generally still suffer from a nonuniform distribution of abrasive media particles and an insufficient particle velocity to preferentially blast the coating desired to be removed instead of the underlying substrate.

The prior art has also tried supersonic fan nozzles where the throat of the nozzle opens to a largely unwalled open divergence volume, apparently because of concerns with wear. These nozzles have also met with limited success and are not currently used in production. The unconstrained divergence area may contribute to a lack of uniform particle distribution and velocities at the somewhat undefined nozzle exit.

The prior art has also used supersonic fan nozzles with cryogenic particles, such as frozen carbon dioxide. The dimensions of these fan nozzles, sized for use with very high pressure ratios and with pressurized air supplies capable of delivering 350 CFM, unfortunately also suffer from a nonuniform distribution of abrasive media particles. Moreover, such nozzles using $CO_2$ pellets as the abrasive media have, in paint removal from aircraft tests, too severely damaged underlying aircraft skins made of composite material or thin aluminum to be usable for such tasks.

Thus it is seen that there is a need for a nozzle for abrasive blast removal of coatings, particularly for use with softer media, that will better remove coatings from delicate metal and composite substrates faster, with less substrate damage, and with more precise edge control.

It is, therefore, a principal object of the present invention to provide an improved nozzle for abrasive blast removal of coatings that provides very high abrasive media particle velocities with a very flat particle velocity profile.

It is another principal object of the present invention to provide an improved nozzle for abrasive blast removal of coatings that provides a very uniform distribution of abrasive media particles.

It is an object of the present invention to provide an improved nozzle for abrasive blast removal of coatings that accomplishes the principal objects of the invention with conventional shop pressurized air supplies such as are used with prior art ½ inch nozzles.

It is a feature of the present invention that it can also work with much higher gas pressures than prior art nozzles designed for conventional shop pressurized air supplies, thus producing even higher, and more efficient, blast energies while preserving the objects of uniform particle distribution and velocity profiles.

It is another feature of the present invention that it can remove tough urethane topcoats from fiberglass aircraft components without removing all of the underlying gel coat primer.

It is an advantage of the present invention that it causes less residual stress damage to substrates than do prior art nozzles.

It is another advantage of the present invention that its efficiency and removal rate is far greater than prior art nozzles.

These and other objects, features and advantages of the present invention will become apparent as the description of certain representative embodiments proceeds.

SUMMARY OF THE INVENTION

The present invention provides a supersonic fan nozzle that can accelerate abrasive media, particularly plastic, to velocities sufficient to remove coatings from metal and composite substrates faster, with less damage, and with more precise edge control than prior art round-conical and fan nozzles. The unique discovery of the present invention is that successful abrasive blast removal of coatings from metal and composite substrates, particularly removal with minimum damage to substrates, requires high velocities and very flat particle distribution and velocity profiles across a cross section of the exit stream, that to achieve these goals requires a precisely dimensioned flat and thin supersonic fan nozzle, and that among the key dimensions are the exit area to throat area ratio and the divergence half-angle of the diverging slot outlet.

Accordingly, the present invention is directed to a supersonic fan nozzle for removing coatings from delicate substrates by abrasive blasting without damaging the substrate, comprising an inlet for receiving a gasflow stream of abrasive media entrained in a pressurized gas, a rectangular opening mated to the inlet, a rectangular throat extending from the rectangular opening and, extending from the throat, a diverging slot outlet diverging at a constant divergence half-angle of about 5 to about 8 degrees, wherein the length of the slot outlet is determined by a slot outlet exit area to throat area ratio in a range of about 2.2 to about 2.5. The rectangular opening may be about 1.57 inches wide and about 0.060 inch to about 0.187 inch high, the rectangular throat about 1.57 inch wide, of constant height of about 0.060 to about 0.187 inch, and about 1 inch long and the diverging slot outlet of constant height of about 0.060 to about 0.187 inch and diverging from a width of about 1.57 inches. The rectangular opening, the rectangular throat and the diverging slot outlet may all three be the same constant height of about 0.125 inch, with the diverging slot outlet diverging at a constant divergence half-angle of about 6.5 degrees to a slot outlet exit width of about 3.75 inches. The height of the slot outlet may be not constant and expand or contract from where the slot outlet meets the throat to the final outlet height of the slot outlet at a slot height expansion half-angle of about 0.25 to about 1.5 degrees.

The invention is also directed to a supersonic fan nozzle comprising an inlet for receiving a gasflow stream of abrasive media entrained in a pressurized gas, a rectangular opening mated to the inlet, a rectangular throat extending from the rectangular opening, extending from the throat, a diverging slot outlet diverging at a constant divergence half-angle of about 5 to about 8 degrees, wherein the length of the slot outlet is determined by a slot outlet exit area to throat area ratio in a range of about 1.6 to about 2.5, and wherein the height of the slot outlet is not constant and contracts from where the slot outlet meets the throat to a final outlet height of the slot outlet at a slot height contraction half-angle of about 0.25 to about 1.5 degrees.

The invention is further directed to a method for removing a coating from a substrate by abrasive blasting without damaging the substrate, comprising the steps of providing a supersonic fan nozzle, including an inlet for receiving a gasflow stream of abrasive media entrained in a pressurized gas, a rectangular opening mated to the inlet, a rectangular throat extending from the rectangular opening and, extending from the throat, a diverging slot outlet diverging at a constant divergence half-angle of about 5 to about 8 degrees, wherein the length of the slot outlet is determined by a slot outlet exit area to throat area ratio in a range of about 2.2 to about 2.5, supplying a gasflow stream of abrasive media entrained in a gas pressurized from about 15 to about 80 psig and blasting the coating with the gasflow stream from the nozzle outlet. The rectangular opening may be about 1.57 inches wide and about 0.060 inch to about 0.187 inch high, the rectangular throat about 1.57 inches wide, of constant height of about 0.060 to about 0.187 inch, and about 1 inch long and the diverging slot outlet of constant height of about 0.060 to about 0.187 inch and diverges from a width of about 1.57 inches.

The invention is yet further directed to a method for removing a coating from a substrate by abrasive blasting, comprising the steps of providing a supersonic fan nozzle, including an inlet for receiving a gasflow stream of abrasive media entrained in a pressurized gas, a rectangular opening mated to the inlet, a rectangular throat extending from the rectangular opening, and extending from the throat, a diverging slot outlet diverging at a constant divergence half-angle of about 5 to about 8 degrees, wherein the length of the slot outlet is determined by a slot outlet exit area to throat area ratio in a range of about 1.6 to about 2.5, wherein the eight of the slot outlet is not constant and contracts from where the slot outlet meets the throat to a final outlet height of the slot outlet at a slot height contraction half-angle of about 0.25 to about 1.5 degrees, supplying a gasflow stream of abrasive media entrained in a gas pressurized from about 15 to about 80 psig, and blasting the coating with the gasflow stream from the nozzle outlet.

DESCRIPTION OF THE DRAWINGS

The present invention will be more clearly understood from a reading of the following detailed description in conjunction with the accompanying drawings wherein.

DETAILED DESCRIPTION

Figure 1:
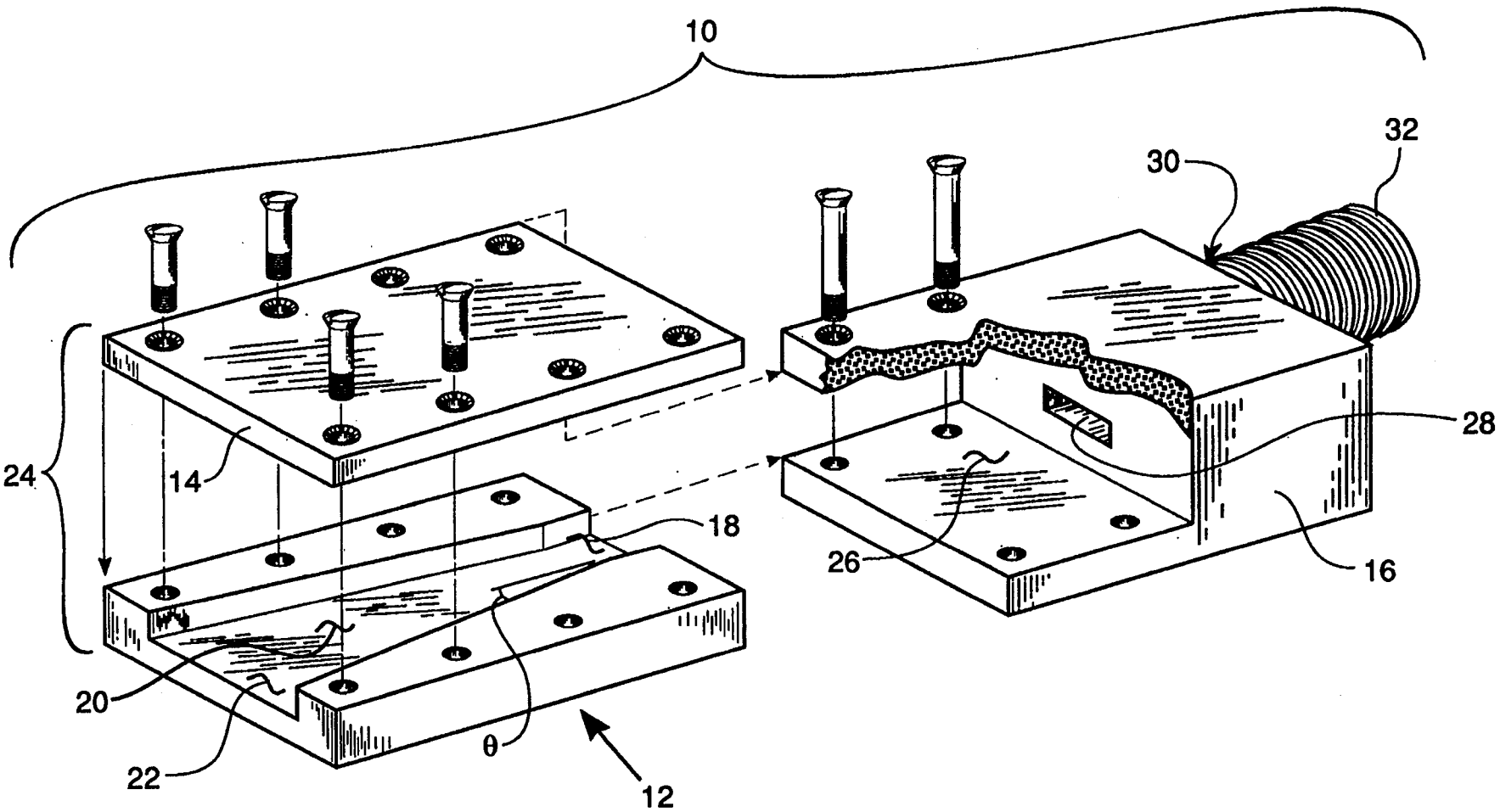
FIG. 1 shows a perspective view of a disassembled example embodiment of a supersonic fan nozzle according to the teachings of the present invention; and, FIG. 2 shows a graph comparing representative velocity profiles (or abrasive particle distribution profiles) for a prior art conical nozzle, a prior art supersonic fan nozzle and a supersonic fan nozzle made according to the teachings of the present invention.

Referring now to FIG. 1, there is shown a perspective view of a disassembled example embodiment of a supersonic fan nozzle 10 according to the teachings of the present invention. Nozzle 10 includes a nozzle body 12, upper cover plate 14, and nozzle-to-hose coupling 16. Nozzle body 12 is made from a 0.250 inch thick aluminum plate having a machined slot 0.125 inch deep shaped to provide a 1.57 inch wide throat 18 extending 1 inch in length to a diverging slot outlet 20, which diverges at about a 6.5 degree half-angle $\theta$ for about 9.57 inches to a final exit 22 having a width of about 3.75 inches.

Upper cover plate 14 is made from 0.125 inch flat aluminum plate drilled as needed to attach to nozzle body 12 and nozzle-to-hose body 16 to make a single nozzle unit 24, nozzle unit 24 is then inserted into slot 26 of nozzle-to-hose coupling 16 to mate with rectangular opening 28. Rectangular opening 28 is about 1.57 inches wide and 0.125 inch high to match the dimensions of nozzle body 12.

Nozzle-to-hose coupling 16 is made of aluminum and shaped to mate with nozzle unit 24 at one end and has a threaded connection 30 at its other end for union with conventionally sized industrial blast hose 32.

The described supersonic fan nozzle has been used with a light plastic media, mesh size 12/16 to 60/80, entrained in an airflow stream of air at operating pressures of 15 to 80 psig (from pressurized air supplies capable of delivering up to 175 CFM). It has successfully removed military specification (MIL SPEC) paint coatings from aluminum and composite substrates with minimum damage to the underlying substrates. It has also removed a photoresist maskant from electronic circuit boards without degradation of the substrate electrical components. In these operations, the new nozzle demonstrated linear travel speeds up to 8 feet per minute, and a paint removal speed of 2 sq.ft. to 6.5 sq.ft. per minute with a 6.5 to 9 inch swath. It also demonstrated precise edge control of the swath.

The described supersonic fan nozzle was particularly successful at removing coatings with minimum residual stress effects. These residual stress effects can be measured by a variation of a standard test using so-called Almen strips. In a standard military test procedure (MIL-S-13165), 0.032 inch thick 2023-T3 bare aluminum strips 0.75 inch wide by 3 inches long are perpendicularly blasted for a period of time sufficient to remove a standard artificially aged MIL SPEC paint coating. After the coating is removed, and following three blast cycles on the bare substrate, the strip is then allowed to rest freely and any resulting arc height from the bending of the strip by the impact forces of the abrasive blasting is a measure of the resulting residual stresses. The described supersonic fan nozzle successfully resulted in Almen arc height averaging just under 3.0 mils for a standard MIL SPEC paint coating on 2024-T3 0.032 inch thick bare aluminum test strips blasted four cycles.

The described supersonic fan nozzle has also demonstrated a desirable ability to remove a polyurethane topcoat from fiberglass aircraft components without removing all of the underlying gel coat primer.

The key dimensions for a supersonic fan nozzle to successfully perform as described are the exit area to throat area ratio and the divergence half-angle of the diverging slot outlet. Optimal dimensions allow smooth supersonic expansion which provides smooth acceleration of the abrasive particles to the maximum velocity possible with the available airstream energy. Experiments have shown that the optimum dimensions are an exit area to throat area ratio of about 2.2 to about 2.5 combined with a divergence half-angle of about 5 to about 8 degrees. The low divergence half-angle results in a relatively long slot outlet in order to achieve the desired exit area to throat area ratio. The length is needed in order to obtain good acceleration of the media. This is particularly important because conventional shop air supplies (80–120 psig and 150–200 CFM) are not capable of producing media particle velocities high enough to efficiently remove coatings, particularly across the width of a fan nozzle, without an extended acceleration time. As a rule of thumb, the ratio of the length of the slot outlet to the throat width should be in a range of about 6 to about 7. The range of divergence half-angles are the range of angles within which the flow will not begin to separate (from too wide a divergence half-angle) or become turbulent (from too narrow a divergence half-angle) which will prevent both accelerating the particles to a sufficient velocity and achieving a uniform velocity distribution at the exit of the slot outlet.

For the described nozzle to work successfully, generally as a rule of thumb the height of the throat and slot outlet should be about 2 to about 3 times the equivalent round diameters of the media particles.

The throat area must be sized to available blast hose sizes. Blast hoses typically have inside diameters of 1 to 1.25 inches. The nozzle throat must be smaller than the smallest possible inside cross-sectional area of the hose to ensure that choking of the blast stream will occur in the throat. Because bending blast hoses reduces their smallest possible cross-sectional areas, the cross-sectional area of the nozzle throat should generally be less than 75% of the nominal inside cross-sectional area of the blast hose.

It is clear that the successfully working dimensions are greatly interrelated. Stating a few dimensions determines the others and constrains the overall geometry of the nozzle. Generally, at exit area to throat area ratios below about 2.2 the resulting media particle velocity from the combination of all the dimensions drops below a workable level. Similarly, at ratios above about 2.5, with the air available from conventional supplies, the media velocity similarly drops. Only in the described narrow range of exit area to throat area ratios, divergence half-angles and slot outlet lengths do all the dimensions combine to produce a fan nozzle that will remove coatings quickly and efficiently from delicate substrates without damaging the substrate.

Figure 2:
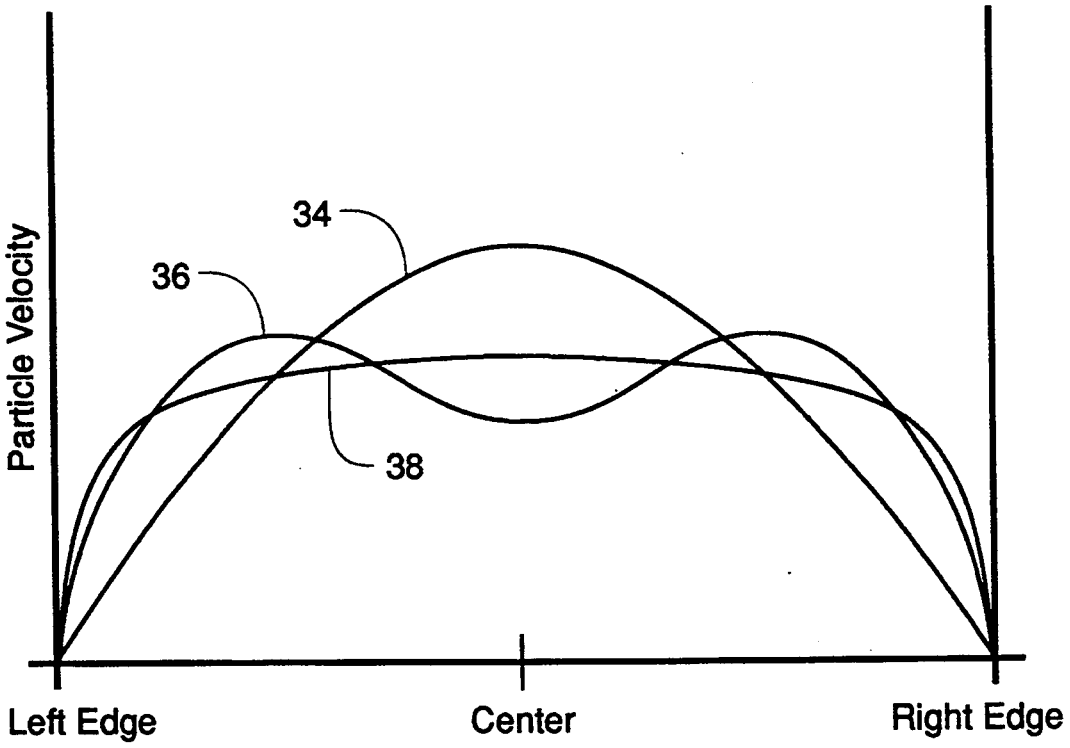

FIG. 2 shows a graph comparing representative velocity profiles (or abrasive particle distribution profiles) for a prior art conical nozzle 34, a supersonic fan nozzle 36 having dimensions outside the described ranges and a supersonic fan nozzle 38 made according to the teachings of the present invention.

The FIG. 2 graph makes obvious that neither conical nozzles nor supersonic fan nozzles having dimensions outside the described ranges are suitable for removing coatings from delicate substrates, particularly if a wide swath is desired. As nozzles having profiles 34 and 36 are brought closer (for faster removal or simply by accident) to the surface of a coating to be removed, before the lower velocity (or lower particle density) particles reach a level sufficient to remove the coating, the higher velocity (or particle density) regions of the profiles have already overblasted and possibly damaged the underlying delicate substrate.

Profile 38, created by a supersonic fan nozzle according to the teachings of the present invention, is more flat so that, as the supersonic fan nozzle is brought closer to the coating surface, a wide swath of coating is removed without damage to the underlying substrate.

Abrasively blasting coatings over soft surfaces that are not robust is different from abrasively blasting coatings over hard substrates that can withstand hot spots. More uniform velocity and particle distribution profiles are needed to obtain a wide swath without damaging the substrate.

Other dimensions of the described supersonic fan nozzle may be varied over a relatively narrow range. The slot height, or depth, may range from about 0.060 inches to about 0.187 inches.

Another possible variation is to account for a boundary layer buildup by providing for an increasing slot depth or height from the throat to the exit. This expansion half-angle would typically be from about 0.25 degrees to about 1.5 degrees at a constant half-angle. An Ojive contour may be used as well. A contraction half-angle of the same range may also be used to concentrate the blast stream (and thus concentrate the media) for use with very small media such as sodium bicarbonate. For use with, for example, sodium bicarbonate, the optimum exit area to throat area ratio may range from about 1.6 to about 2.5 and the height of the slot outlet may range from about 0.125 inch where it meets the throat to about 0.090 inches at the exit with a width about 3.75 inches. The lower exit area to throat area ratios, such as 1.6, appear to work particularly well with sodium bicarbonate.

Because the described supersonic fan nozzle, to achieve its desirable performance, creates a much higher pressure ratio across the throat than prior art designs, higher levels of erosion will exist with more abrasive media. For this reason, a highly abrasion resistant liner material, such as tungsten carbide, would be needed to use the nozzle for, as an example, sand blasting.

The described supersonic fan nozzle, because of its wide and even swath, is particularly suitable to being ganged on, for example, a production line to strip electronic circuit boards of their photoresist coatings.

The disclosed abrasive blasting nozzle successfully demonstrates the use of a supersonic nozzle to achieve a desirable even distribution of abrasive media and a flat velocity profile at its exit. Although the disclosed apparatus is specialized, its teachings will find application in other areas where the performance of existing equipment may benefit from increasing the speed, pressure or other operating parameters.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

I claim:

1. A supersonic fan nozzle for removing coatings from delicate substrates by abrasive blasting without damaging the substrate, comprising:

(a) an inlet for receiving a gasflow stream of abrasive media entrained in a pressurized gas;

(b) a rectangular opening mated to the inlet;

(c) a rectangular throat extending from the rectangular opening; and, (d) extending from the throat, a diverging slot outlet diverging at a constant divergence half-angle of about 5 to about 8 degrees, wherein the length of the slot outlet is determined by a slot outlet exit area to throat area ratio of about 2.2 to exactly 2.45.

2. The supersonic fan nozzle according to claim 1, wherein:

(a) the rectangular opening is about 1.57 inches wide and about 0.060 inch to about 0.187 inch high;

(b) the rectangular throat is about 1.57 inches wide, of constant height of about 0.060 to about 0.187 inch, and about 1 inch long; and, (c) the diverging slot outlet is of constant height of about 0.060 to about 0.187 inch and diverges from a width of about 1.57 inches.

3. The supersonic fan nozzle according to claim 1, wherein the rectangular opening, the rectangular throat and the diverging slot outlet are all three the same constant height of about 0.125 inches, and the diverging slot outlet diverges at a constant divergence half-angle of about 6.5 degrees to a slot outlet exit width of about 3.75 inches.

4. A method for removing a coating from a substrate by abrasive blasting without damaging the substrate, comprising the steps of:

(a) providing a supersonic fan nozzle, including:

(i) an inlet for receiving a gasflow stream of abrasive media entrained in a pressurized gas;

(ii) a rectangular opening mated to the inlet;

(iii) a rectangular throat extending from the rectangular opening; and, (iv) extending from the throat, a diverging slot outlet diverging at a constant divergence half-angle of about 5 to about 8 degrees, wherein the length of the slot outlet is determined by a slot outlet exit area to throat area ratio of about 2.2 to exactly 2.45;

(b) supplying a gasflow stream of abrasive media entrained in a gas pressurized from about 15 to about 80 psig; and, (c) blasting the coating with the gasflow stream from the nozzle outlet.

5. The method for removing a coating from a substrate according to claim 4, wherein:

(a) the rectangular opening is about 1.57 inches wide and about 0.060 inch to about 0.187 inch high;

(b) the rectangular throat is about 1.57 inches wide, of constant height of about 0.060 to about 0.187 inch, and about 1 inch long; and, (c) the diverging slot outlet is of constant height of about 0.060 to about 0.187 inch and diverges from a width of about 1.57 inches.

6. A method for removing a coating from a substrate by abrasive blasting, comprising the steps of:

(a) providing a supersonic fan nozzle, including:

(i) an inlet for receiving a gas flow stream of abrasive media entrained in a pressurized gas;

(ii) a rectangular opening mated to the inlet;

(iii) a rectangular throat extending from the rectangular opening;

(iv) extending from the throat, a diverging slot outlet diverging at a constant divergence half-angle of about 5 to about 8 degrees, wherein the length of the slot outlet is determined by a slot outlet exit area to throat area ratio of about 2.2 to exactly 2.45; and, (v) wherein the height of the slot outlet is not constant and contracts from where the slot outlet meets the throat to a final outlet height of the slot outlet at a slot height contraction half-angle of about 0.25 to about 1.5 degrees;

(b) supplying a gasflow stream of abrasive media entrained in a gas pressurized from about 15 to about 80 psig; and, (c) blasting the coating with the gasflow stream from the nozzle outlet.

* * * * *